(12) United States Patent
Bird et al.

(10) Patent No.: US 8,972,172 B2
(45) Date of Patent: Mar. 3, 2015

(54) WIRELESS SENSOR NETWORK TRAFFIC NAVIGATION ANALYTICS

(75) Inventors: Theodore M. Bird, Park City, UT (US); Nelson Y H Hsu, New Taipei (TW); Devang D. Patel, Dublin, CA (US); Ro Pun Wong, Tainan (TW)

(73) Assignee: International Business Machines Corporation, Armonk, NY (US)

( * ) Notice: Subject to any disclaimer, the term of this patent is extended or adjusted under 35 U.S.C. 154(b) by 608 days.

(21) Appl. No.: 13/099,443

(22) Filed: May 3, 2011

(65) Prior Publication Data

US 2012/0283945 A1 Nov. 8, 2012

(51) Int. Cl.
G08G 1/0967 (2006.01)
G01C 21/34 (2006.01)
G08G 1/09 (2006.01)

(52) U.S. Cl.
CPC .............. *G01C 21/3492* (2013.01); *G08G 1/09* (2013.01); *G08G 1/0967* (2013.01); *G08G 1/096791* (2013.01)
USPC ........................ 701/414; 701/423; 340/995.13

(58) Field of Classification Search
CPC . G08G 1/09; G08G 1/0967; G08G 1/096791; G01C 21/3492
USPC ............................. 701/414, 423; 340/995.13
See application file for complete search history.

(56) References Cited

U.S. PATENT DOCUMENTS

| 5,428,544 | A * | 6/1995 | Shyu | 701/117 |
|---|---|---|---|---|
| 6,175,805 | B1 * | 1/2001 | Abe | 701/533 |
| 6,317,686 | B1 * | 11/2001 | Ran | 701/533 |
| 6,333,703 | B1 * | 12/2001 | Alewine et al. | 340/995.13 |
| 6,708,107 | B2 * | 3/2004 | Impson et al. | 701/117 |
| 6,711,493 | B1 * | 3/2004 | Andrews et al. | 701/117 |
| 7,098,805 | B2 * | 8/2006 | Meadows et al. | 340/905 |
| 7,188,025 | B2 * | 3/2007 | Hudson, Jr. | 701/117 |
| 7,440,842 | B1 * | 10/2008 | Vorona | 701/117 |
| 7,609,172 | B2 * | 10/2009 | Rozum et al. | 340/901 |
| 7,760,112 | B2 * | 7/2010 | Bauchot et al. | 340/905 |
| 7,804,423 | B2 * | 9/2010 | Mudalige et al. | 340/902 |
| 7,877,196 | B2 * | 1/2011 | Lin et al. | 701/117 |
| 8,068,973 | B2 * | 11/2011 | Yamane et al. | 701/117 |
| 8,155,867 | B2 * | 4/2012 | Krause | 701/123 |
| 2006/0247844 | A1 | 11/2006 | Wang et al. | |

(Continued)

OTHER PUBLICATIONS

Wikipedia; Wireless Sensor Network; Aug. 6, 2009.

*Primary Examiner* — John Q Nguyen
*Assistant Examiner* — Michael Whalen
(74) *Attorney, Agent, or Firm* — Parashos Kalaitzis; Robert C. Rolnik

(57) ABSTRACT

A mobile sensor receives a mobile sensor location and destination. The mobile sensor determines, from a repository of road segments, a plurality of routes having a first endpoint corresponding to the mobile sensor location, and a second endpoint corresponding to the destination. The mobile sensor receives transit data from a plurality of peer mobile sensors, wherein each transit data comprises a peer mobile sensor's velocity and a peer mobile sensor's location. The mobile sensor stores at least one transit data based on the peer mobile sensor's velocity and peer mobile sensor's location corresponding to at least one of the plurality of routes, thereby forming at least one stored transit data. The mobile sensor determines that a sampling period has expired. The mobile sensor reports a route corresponding to a stored transit route having best transit data or no transit data, wherein the route is among the plurality of routes.

17 Claims, 5 Drawing Sheets

(56) References Cited

U.S. PATENT DOCUMENTS

| | | | |
|---|---|---|---|
| 2008/0129546 A1* | 6/2008 | Manor | 340/936 |
| 2008/0208441 A1* | 8/2008 | Cheung | 701/117 |
| 2008/0287144 A1* | 11/2008 | Sabata et al. | 455/456.6 |
| 2008/0319648 A1* | 12/2008 | Poltorak | 701/202 |
| 2011/0004397 A1* | 1/2011 | Nagase | 701/119 |
| 2011/0015851 A1* | 1/2011 | Burr et al. | 701/117 |
| 2011/0121993 A1* | 5/2011 | Davis et al. | 340/911 |
| 2011/0224893 A1* | 9/2011 | Scofield et al. | 701/119 |
| 2011/0224898 A1* | 9/2011 | Scofield et al. | 701/200 |
| 2011/0227724 A1* | 9/2011 | Zhao et al. | 340/539.11 |

* cited by examiner

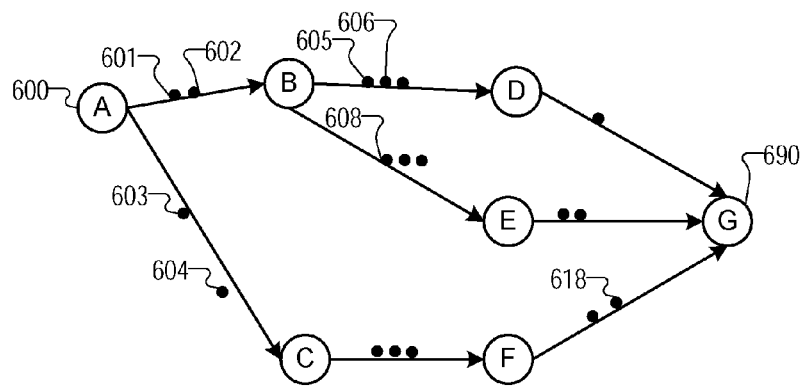

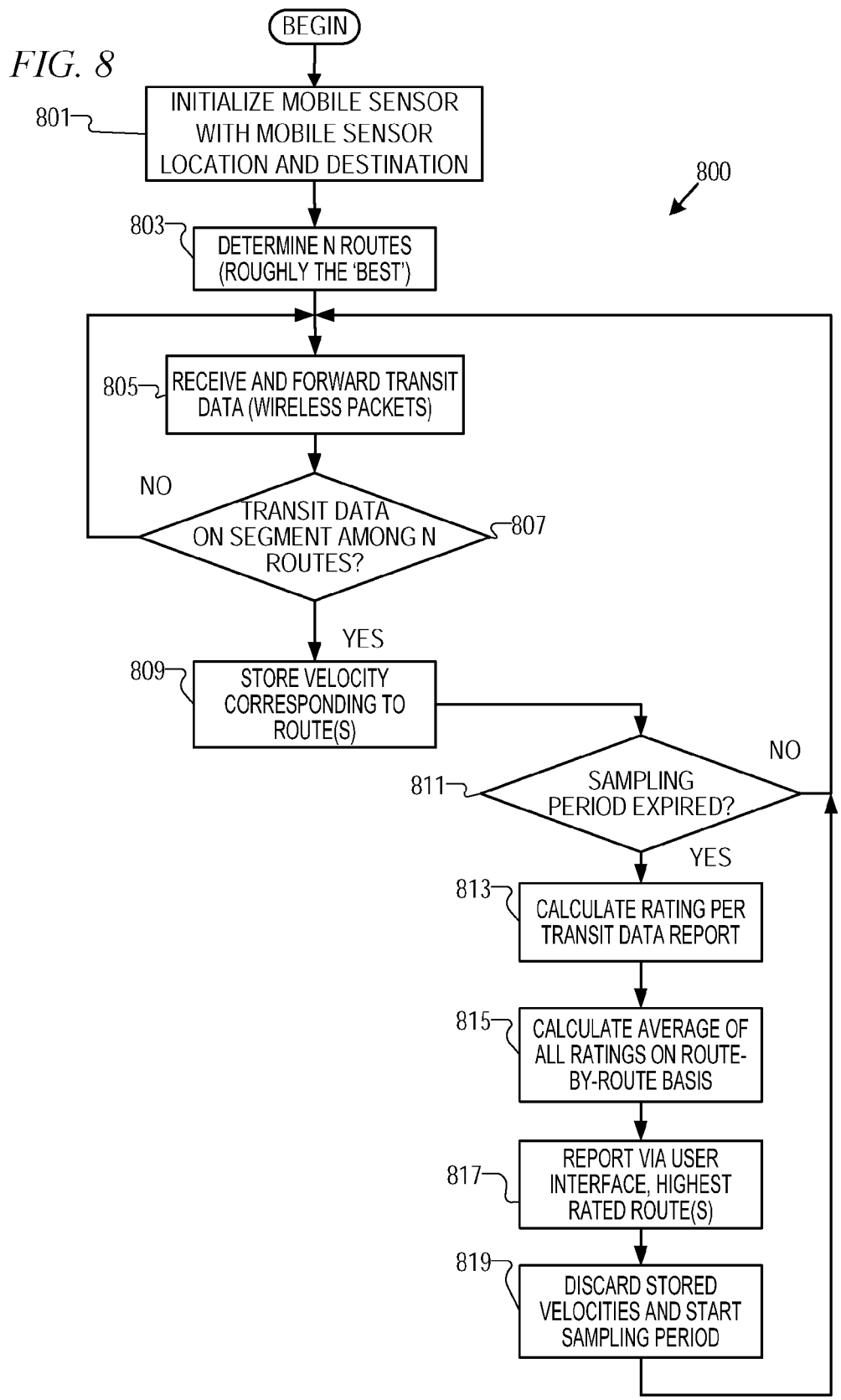

WIRELESS SENSOR NETWORK TRAFFIC NAVIGATION ANALYTICS

BACKGROUND OF THE INVENTION

1. Field of the Invention

The present invention relates generally to a computer implemented method, data processing system, and computer program product for selecting routes between a starting point and a destination. More specifically, the present invention relates to the assignments of ratings to vehicles, road segments and routes so that ratings can be assigned to alternative routes from a vehicle to its destination.

2. Description of the Related Art

One of the problems faced by automobile drivers on a daily basis, particularly in densely populated areas, is the possibility that the drivers' routes of travel may be unpredictably subject to slow downs and stoppages due to a variety of causes. Such congestion wastes commuters' time, increases fuel consumption, and exacerbates air pollution. One of the most significant causes of such slow downs, in addition to accidents and other unpredictable events, is inefficient use of existing roadways. Statistics show that in some larger cities in China major roads, which compose only one-third of the road network, handle 80% of all vehicular traffic, while secondary roads only handle 20% of all vehicular traffic. Improving road utilization efficiency has become a major topic of both government and academic research.

One solution to this problem would be to enable a driver to monitor traffic density and speeds along the driver's projected route of travel on a real-time or near-time basis using portable, wireless devices the driver can carry while traveling. When the driver detects a problem along the intended route of travel, she can choose another route that is flowing smoothly. If such portable devices are to accurately display traffic density and speed on a real-time or near-time basis, they must continuously receive data on vehicular traffic reflecting traffic density and speed corresponding to multiple physical locations. This presents two significant challenges.

First, collecting detailed traffic data for a large municipality requires continuously measuring traffic speed and density at a large number of physical locations. Such a system requires a significant capital expenditure for setting up sensor locations for data collection.

Second, such data has the potential to be extremely voluminous. Many hundreds of vehicles may pass a specific spatial point over the course of a minute. Furthermore, in order to reflect accurately the flow of vehicular traffic along multiple routes, data from many spatial points must be processed. Thus, if vehicular traffic data were broadcast at its lowest level of detail, the prior art warns of overwhelming the receiving and processing capacity of small wireless devices.

SUMMARY OF THE INVENTION

The present invention provides a computer implemented method, and computer program product for selecting routes corresponding to a mobile sensor location. The computer can be implemented in a mobile sensor. The mobile sensor receives a mobile sensor location and a destination. The mobile sensor determines, from a repository of road segments, a plurality of routes having a first endpoint corresponding to the mobile sensor location, and a second endpoint corresponding to the destination, wherein each route is a distance-limited set of segments that connect at endpoints. The mobile sensor receives transit data from a plurality of peer mobile sensors, wherein each transit data comprises a peer mobile sensor's velocity and a peer mobile sensor's location. The mobile sensor stores at least one transit data based on the peer mobile sensor's velocity and peer mobile sensor's location corresponding to at least one of the plurality of routes, thereby forming at least one stored transit data. The mobile sensor determines that a sampling period has expired. The mobile sensor reports at least a route corresponding to a stored transit route having best transit data or no transit data, wherein the route is among the plurality of routes.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 4 is content of a transit data message in accordance with an illustrative embodiment of the invention;

FIG. 5 is a subset of segment descriptions in a repository for geographic information system data in accordance with an illustrative embodiment of the invention;

FIG. 6 is a directed graph showing routes that permit travel from point A to point G, with mobile sensors identified along each segment in accordance with an illustrative embodiment of the invention;

FIG. 7 is a table of ratings corresponding to each mobile sensor depicted in FIG. 6 in accordance with an illustrative embodiment of the invention;

FIG. 8 is a flowchart of processing performed at a mobile sensor in response to received transit data in accordance with an illustrative embodiment of the invention.

DETAILED DESCRIPTION OF THE PREFERRED EMBODIMENT

Figure 1:
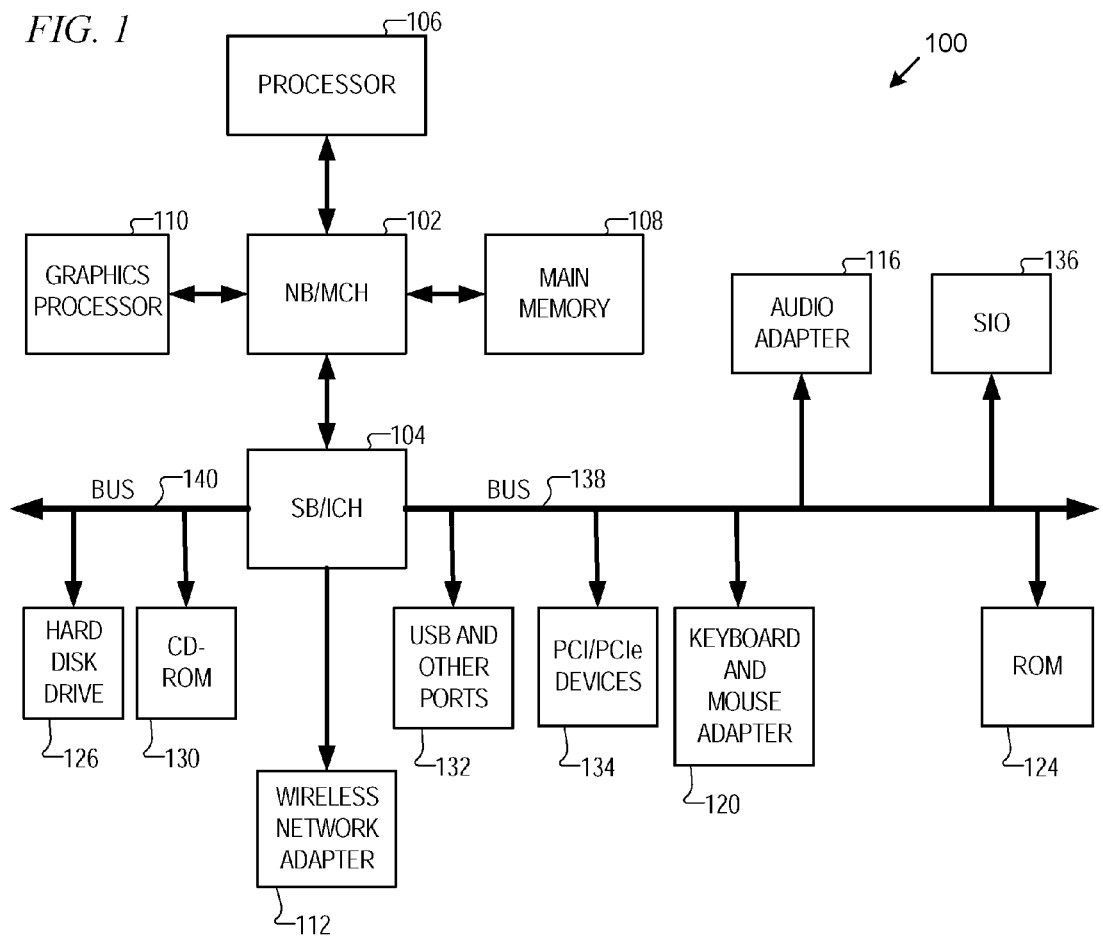
FIG. 1 is a block diagram of a mobile sensor in accordance with an illustrative embodiment of the invention.

With reference now to the figures and in particular with reference to FIG. 1, a block diagram of a mobile sensor is shown in which aspects of an illustrative embodiment may be implemented. Mobile sensor 100 is an example of a computer, in which code or instructions implementing the processes of the present invention may be located. In the depicted example, mobile sensor 100 employs a hub architecture including a north bridge and memory controller hub (NB/MCH) 102 and a south bridge and input/output (I/O) controller hub (SB/ICH) 104. Processor 106, main memory 108, and graphics processor 110 connect to north bridge and memory controller hub 102. Graphics processor 110 may connect to the NB/MCH through an accelerated graphics port (AGP), for example.

In the depicted example, wireless network adapter 112 connects to south bridge and I/O controller hub 104 and audio adapter 116, keyboard and mouse adapter 120, read only memory (ROM) 124, hard disk drive (HDD) 126, CD-ROM drive 130, universal serial bus (USB) ports and other communications ports 132, and PCI/PCIe devices 134 connect to south bridge and I/O controller hub 104 through bus 138 and bus 140. PCI/PCIe devices may include, for example, Ethernet adapters, add-in cards, and PC cards for notebook computers. PCI uses a card bus controller, while PCIe does not. ROM 124 may be, for example, a flash binary input/output system (BIOS). Hard disk drive 126 and CD-ROM drive 130 may use, for example, an integrated drive electronics (IDE) or serial advanced technology attachment (SATA) interface. A super I/O (SIO) device 136 may be connected to south bridge and I/O controller hub 104.

An operating system runs on processor 106, and coordinates and provides control of various components within mobile sensor 100 in FIG. 1. The operating system may be a commercially available operating system such as Microsoft® Windows® XP. Microsoft and Windows are trademarks of Microsoft Corporation in the United States, other countries, or both. An object oriented programming system, such as the Java™ programming system, may run in conjunction with the operating system and provides calls to the operating system from Java™ programs or applications executing on mobile sensor 100. Java™ is a trademark of Sun Microsystems, Inc. in the United States, other countries, or both.

Instructions for the operating system, the object-oriented programming system, and applications or programs are located on computer readable tangible storage devices, such as hard disk drive 126, and may be loaded into main memory 108 for execution by processor 106. The processes of the present invention can be performed by processor 106 using computer implemented instructions, which may be located in a memory such as, for example, main memory 108, read only memory 124, or in one or more peripheral devices.

Those of ordinary skill in the art will appreciate that the hardware in FIG. 1 may vary depending on implementation. Other internal hardware or peripheral devices, such as flash memory, equivalent non-volatile memory, and the like, may be used in addition to or in place of the hardware depicted in FIG. 1. In addition, the processes of the illustrative embodiments may be applied to a multiprocessor data processing system form of a mobile sensor.

In some illustrative examples, mobile sensor 100 may be a smart phone, which is configured with flash memory to provide non-volatile memory for storing operating system files and/or user-generated data. A bus system may be comprised of one or more buses, such as a system bus, an I/O bus, and a PCI bus. Of course, the bus system may be implemented using any type of communications fabric or architecture that provides for a transfer of data between different components or devices attached to the fabric or architecture. A communication unit may include one or more devices used to transmit and receive data, such as a modem or a network adapter. A memory may be, for example, main memory 108 or a cache such as found in north bridge and memory controller hub 102. A processing unit may include one or more processors or CPUs. The depicted example in FIG. 1 is not meant to imply architectural limitations. For example, mobile sensor 100 also may be a tablet computer, laptop computer, or personal digital assistant in addition to taking the form of a smart phone.

The terminology used herein is for the purpose of describing particular embodiments only and is not intended to be limiting of the invention. As used herein, the singular forms "a", "an", and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The following embodiment was chosen and described in order to best explain the principles and practical application of the invention, and to enable others of ordinary skill in the art to understand the invention for various embodiments with various modifications as are suited to the particular use contemplated.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable storage device(s) may be utilized. A computer readable storage device may be, for example, but not limited to, an electronic, magnetic, optical, electromagnetic, or semiconductor system, apparatus, or device, or any suitable combination of the foregoing. More specific examples (a non-exhaustive list) of the computer readable storage device would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage device may be any tangible device that can store a program for use by or in connection with an instruction execution system, apparatus, or device. The term "computer-readable storage device" does not encompass a signal propagation media such as a copper transmission cable, an optical transmission fiber or wireless transmission media.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It is understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine such that the instructions, which execute via the processor of the computer or other programmable data processing apparatus, create means for implementing the functions/acts specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 2:
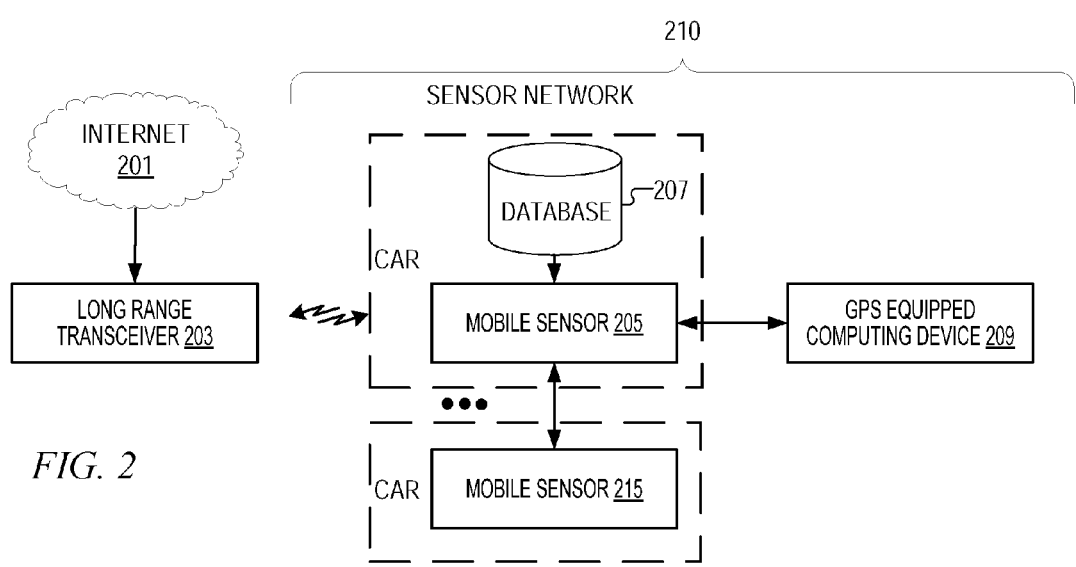
FIG. 2 is a block diagram of an ad hoc network of mobile sensors in accordance with an illustrative embodiment of the invention.

FIG. 2 is a block diagram of an ad hoc network of mobile sensors in accordance with an illustrative embodiment of the invention. A mobile sensor may be located within a vehicle, such as a car. The mobile sensor can rely on a repository of road segments, such as, for example, database 207. A repository of road segments is a database that correlates road features to a geographical reference, such as may be provided by global positioning satellites, or other wireless references. Global positioning satellites can be, for example, GPS, Galileo positioning system, Glonass radio-based satellite navigation system, and the like.

Mobile sensor 205 may obtain location data from GPS equipped computing device 209. The GPS equipped computing device can be a navigation system that relies on GPS signals to compute latitudes and longitudes that are estimated to be the location of the antenna that the GPS equipped computing device uses to collect wireless location references.

Mobile sensor 205 can be a part of an ad hoc network of mobile sensors such as sensor network 210. Sensor network 210 comprises a plurality of mobile sensors, including mobile sensor 215. A peer mobile sensor is mobile sensor which exchanges at least one packet with a mobile sensor. A peer mobile sensor belongs to the sensor network. The sensor network may communicate by forming ad hoc paths for routing packets carried on wireless signals. The packets carry transit data.

The purpose of the sensor network is to send, forward, and eventually deliver transit data in packets to one or more vehicle-carried mobile sensors so that those mobile sensors may consume and process transit data into a summary of road conditions relevant to the destination a user selected earlier. Transit data is any information reported by a mobile sensor, regardless of whether the mobile sensor is in motion at the time of transmitting the data. Transit data may include location and velocity data, vehicle statistics, and/or ambient conditions, such as weather phenomena. Location, such as a mobile sensor's location, can be earth-centric latitude, longitude and elevation derived from, for example, global positioning satellites (GPS). As such, location can be modified by dead-reckoning, and supplemented by non-satellite wireless signals during intervals that GPS signaling is unavailable. Dead-reckoning is a location estimation method that allows further estimations of position based upon known or estimated speeds over elapsed time, and course. Although an initial fix, or location, can rely on celestial data sources, dead-reckoning permits continued navigation in the absence of such sources. Accordingly, transit data can be a current estimate of location and velocity. Thus, transit data can include tolerances that specify a degree of certainty or potential error in location and other data. Stored transit data is transit data stored for the purpose of establishing a near real-time assessment of road conditions related to the vehicle that originated the stored transit data. As such, stored transit data may be used or ignored, depending on the freshness of the stored transit data. It is appreciated that the sensor network can relay metadata used to grow, shrink and otherwise maintain the operation of the network.

A mobile sensor location is the location of a sensor that originates the transit data, at least as estimated and reported by the source mobile sensor. A source mobile sensor is a mobile sensor that obtains an estimate of location from a radio device transported as part of, or within, the vehicle. The radio device, as explained, can be GPS equipped computing device 207. The source mobile sensor is distinguishable from an intermediary mobile sensor. An intermediary mobile sensor is a mobile sensor, that with respect to some packets, forwards such packets to any in-range mobile sensors or other transceivers. A mobile sensor can be both a source mobile sensor as well as an intermediary mobile sensor in that, as in the first case, the mobile sensor originates a packet, while in the second case, the mobile sensor forwards ambient packets. In this way, the mobile sensor can function as a link in a chain of transmissions for a packet to depart from a source mobile sensor to reach one or more destination mobile sensors.

A sensor network can transmit data to long range transceivers, such as long range transceiver 203. A long range transceiver is a telecommunications device that is stationary and can handle transmissions according to a cellular standard, wireless data standard, or the like. An example of a wireless data standard includes WiMAX (Worldwide Interoperability for Microwave Access). The long range transceiver may rely on Internet 201 or other communication networks to rebroadcast selected transit data many miles away from long range transceiver 203. Accordingly, some chains of packet transmissions can include a cellular network as one of the links prior to the packet being used for navigational purposes at a vehicle. In some illustrative embodiments, the mobile sensor may receive signals across a hybrid of purely mobile sensors as well as fixed network equipment, such as cellular.

The features of the illustrative embodiments provide at least a method to transmit and propagate transit data via a network having at least two wireless links, and potentially being augmented by ad hoc networks of mobile sensors. Accordingly, intermediary mobile sensors can propagate and/or route packets to vehicles upstream from local traffic conditions. Such transit data, carrying at least velocities of a sampling of local vehicles, can reach distant vehicles similarly equipped with mobile sensors. Accordingly, such a distant vehicle may receive flows of transit data from segments along several optional routes to the distant vehicle. As such, the vehicle may sample the data during discrete periods to assess the relative aggregate conditions, or ratings, along each optional route. The conditions, so synthesized, can be reported to a user or driver of the distant vehicle so that a best route may be reported, among other things. In addition to preparing a report of the relative goodness of each among the optional routes, an exemplary embodiment can provide an ad hoc transport mechanism by which transit data may be sent and retransmitted using mobile sensors as nodes in the ad hoc network.

Figure 3:
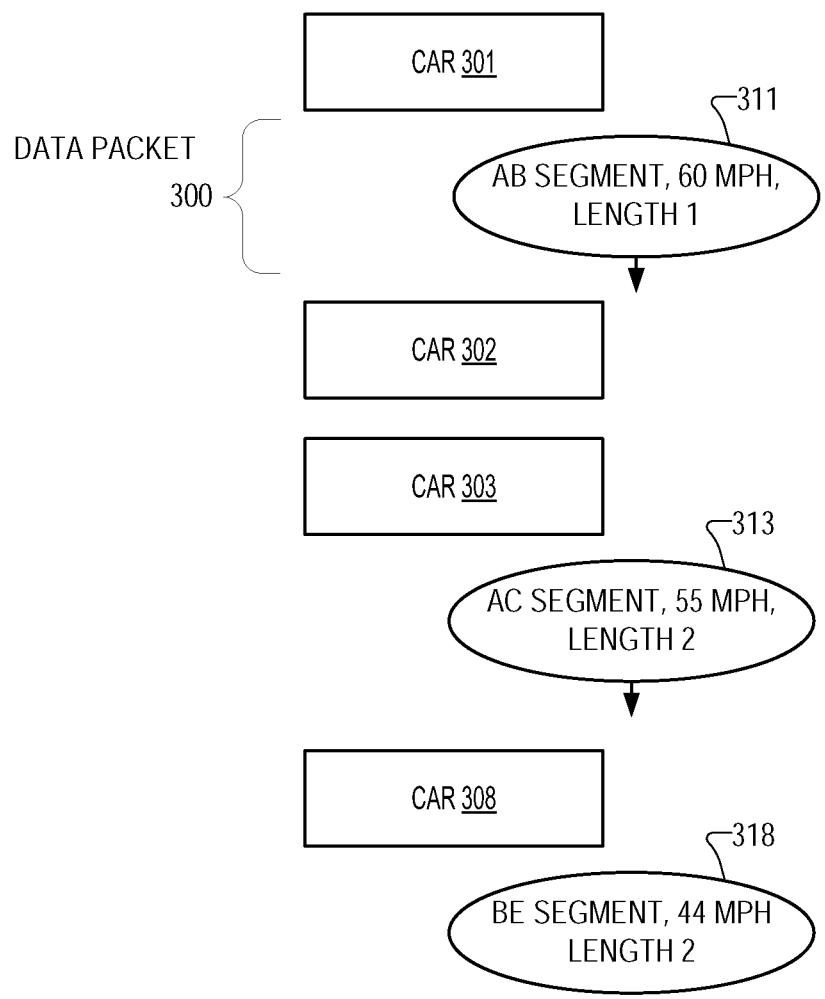
FIG. 3 is a set of transit data or data packets being transferred among peer mobile sensors in accordance with an illustrative embodiment of the invention.

FIG. 3 is a set of transit data or data packets being transferred among peer mobile sensors in accordance with an illustrative embodiment of the invention. Car 301 is an example of a vehicle. Car 301 may originate transit data 311, which is carried in data packet 300. For the sake of simplicity, serial numbers, source addresses, packet timing information, out-of-band signaling, error correction bits and other metadata or data layer packet information is omitted from FIG. 3. It is appreciated that these supporting data fields as well as others can be used to provide correct levels of redundancy, timing, propagation, etc., so that sufficient packets traverse sufficient distances to be useful. In addition, metadata can be used, where necessary, to provide mechanisms to eliminate or reduce relaying packets as needed.

Cars 302, 303, can relay transit data 311 as intermediate mobile sensors so that car 308 may obtain the transit data and use it to compute conditions or ratings concerning road segments traversed by car 301. Additional transit data may originate among the cars and similarly be forwarded, for example, transit data 313 and transit data 318.

Transit data can include details of the segment of which the originating mobile sensor reports. For example, the mobile sensor may report its position as a mobile sensor location. A mobile sensor location is an indication of the location or closest feature of a reporting mobile sensor. The mobile sensor location can be a latitude and longitude, an estimate at the closest nearby intersection, or a segment description, e.g., "AB segment" or "Northbound Mopac highway between exits 221 and 222". In the case of transit data 311 the mobile sensor location is "AB segment". Further explanation of segment descriptions is given in relation to FIG. 6, below.

FIG. 4 is content of a transit data message in accordance with an illustrative embodiment of the invention. As explained, in relation to FIG. 3, mobile sensor location can be expressed in terms of a segment. The fields of an exemplary transit data include mobile sensor data as segment ID 405. A segment is a road that is bounded by two endpoints and traces at least a line that is straight, non-linear, or both. The segment is merely the estimation, either by a source mobile sensor, or a receiving mobile sensor, of the nearest road to the source mobile sensor. Accordingly, some mobile sensors that are actually on a shoulder of a road, or off of the road, but within error tolerances of the road, can be reported as on a given segment. Further types of data that can be reported among transit data include velocity 401. Velocity can include absolute speed, as well as direction. In addition, the source mobile sensor can report a distance of a segment 407. In the case of velocity 401 being reported by a first vehicle to a second vehicle, the first vehicle is a peer to the second vehicle, and the velocity is a peer mobile sensor's velocity. Accordingly, a peer mobile sensor's velocity is the velocity reported by a peer mobile sensor to a mobile sensor. Thus, the contributions of each segment to an overall rating of the route can be included in a determination of a rating for the route. In which case, the stored transit route has a rating based on best transit data or no transit data (for those segments that lack vehicles making reports), as reported by peers to the mobile sensor.

It is appreciated that alternate forms and varying types of information can be included in transit data. For example, transit data can include one or several of the following: black box information, lights, idle time, position change, and outside temperature. Black box information can be information concerning operation of safety equipment, accelerations, and the like. "Lights" can be the status of the several lights on a vehicle, such as, for example, main headlights. Information concerning "position change", can be a distance or a vector that describes a vehicle's movement since an event, such as a previous transmission of a transit data message. Outside temperature can be an immediate, real-time reading of a thermometer, average of several readings of several thermometers, and the like.

FIG. 5 is a subset of segment descriptions in a repository for geographic information system data in accordance with an illustrative embodiment of the invention. The segment descriptions can be stored to a repository of road segments, for example, database 207 of FIG. 2. Some types of data stored to the repository can include segment description 501, length 503, and posted speed limit 505. A segment description can be a geometrical description of the road contours, elevation and the like. A length can be the length of a road segment between two landmarks. The landmarks can be a corner, an intersection, a ramp, a sign, and the like. A posted speed limit is the speed limit assigned and/or reported by a governing body for a road segment or a partial segment. Three rows of segment descriptions, lengths and posted speed limits are shown. As can be appreciated, a complete table for a modern city may have thousands of segments, and thus, thousands of row entries to the repository of geographic information.

FIG. 6 is a directed graph showing routes that permit travel from point A to point G, with mobile sensors identified along each segment in accordance with an illustrative embodiment of the invention. "A" 600 may be a point at which a mobile sensor begins its travel, or alternatively, the nearest navigable road feature to a mobile sensor's current location. In contrast, "G" 690 may be a destination. A destination is an arbitrary goal specified by a user of a mobile sensor. The destination may be entered by use of a keyboard, pointing device, and/or voice inputs using, for example, the mobile sensor 100 of FIG. 1. Accordingly, a user may specify a destination such as "G" 690. FIG. 6 shows three paths by which a vehicle may traverse from point A to point G. The paths or optional routes, are formed by segments. For example, the route among points A, B, D and G (A-B-D-G) includes three segments, namely, AB, BD and DG. Further routes can include A-B-E-G and A-C-F-G. Some of the segments are shown in table 500 of FIG. 5, namely, AB, BD and AC, along with their corresponding lengths and distances.

FIG. 6 also shows vehicles along the three paths. For example, along A-B-D-G vehicles 601, 602, 605 and 606 are present. Similarly, along A-C-F-G, vehicles 603, 604, and 618 are present. It is apparent that some vehicles can be present on two or more routes at the same time. For example, vehicles 601 and 602 are simultaneously present on A-B-D-G and A-B-E-G. Along A-B-E-G vehicles 601, 602, and 608, are present. By present, it is appreciated that the vehicles can be self-identified as being located along an applicable segment. Alternatively, a vehicle's presence can be independently determined by a separate mobile sensor to be present along an applicable segment based on longitude and latitude, or other transit data. Regardless of the manner in which the reporting mobile sensors are matched to road segments, the transit data originating with these vehicles can be used to determine a rating applicable to a route, and thus a measure of optimality for such an optional route.

A route is the combination of segments or partial segments that may be traversed, to reach a destination. The route can be a distance-limited set of segments that connect at endpoints. In other words, a distance algorithm may determine all routes to get from a location to a destination such that all routes are 1.41 times the direct route between two points. A direct route is the Euclidean distance between points.

A route length is the combined length of all segments and partial segments that make up a route. A partial segment is a portion of a segment that has two ends, where at least one of the ends of the partial segment is not an end of the segment. For example, the length of route A-B-D-G may be the sum of its constituent segments, namely AB, BD and DG, or 1 plus 2 plus 2. An outcome to the operations of the illustrative embodiments of the invention may be a determination of which among several routes is estimated to be "best" or, per currently available information, is predicted to provide the lowest travel time under customary driving rules and/or mores applicable to a road/city. A best route can be an estimated quickest route. In other words, the estimated quickest route is the route that a vehicle can traverse in the shortest time, assuming that the vehicle can travel at the speeds reported by mobile sensors along the route and/or processed by a peer mobile sensor. A route description is words and/or symbols that communicate driving directions to a driver. The route description can be a sequence of labeled roads, a sequence of turns, a list of named roads, a highlighted set of lines on a map, and the like.

If the routes and segments of FIG. 6 were an exhaustive listing of all routes in a city or geographic information repository, then the corresponding table 500 (see FIG. 5) would have eight rows of data—one for each segment. As can be appreciated, FIG. 6 is a greatly simplified network diagram of options as compared to what may be used in practice to travel more than a few miles in a modern city. Furthermore, since many trips begin on a driveway that has a single road segment option for ingress and egress, an initial segment can be a partial segment. That is to say, travel begins at a mid-point to the segment. A partial segment is coextensive to a segment. As such, the partial segment has an end at a roadway threshold.

FIG. 7 is a table of ratings corresponding to each mobile sensor depicted in FIG. 6 in accordance with an illustrative embodiment of the invention. Table 700 shows ratings in each cell for which a mobile sensor has provided a transit message during a sampling period or other recent interval. A rating is a number assigned to a mobile sensor, a route, or a segment that can define, along a spectrum of values, how optimal the velocity is of the mobile sensor, how optimal the route is in regards to the collective velocities of reporting mobile sensors on the route, and the like. Ratings for vehicles are computed and stored within a mobile sensor that optimizes routes and reports them to a user. A rating can be computed, for example, for a vehicle present on a route, by summing the distance of the applicable route, and dividing the distance by the vehicle's speed. For instance, a vehicle on a route having a 200 km distance and reporting a speed of 50 kph, has a rating of 200 km/50 kph=4.0. As can be seen, a vehicle can have a different rating depending on the candidate route for which the vehicle's rating is determined. A rating can be computed for a segment on a route, without currently peer reported data from the route, by using the posted speed limit as a proxy for a report by a hypothetical vehicle traveling the segment. Thus, a posted speed limit of 95 kph, of a segment in a 200 km route, can cause that segment to be assigned a rating of 200/95, or 2.11.

A more concrete example is shown in FIG. 8. FIG. 8 shows details on the manner in which a mobile sensor establishes its estimation of the optimized or best route. The ratings, for example, can be based on transit data reported from vehicles shown in FIG. 6. Ratings 760 are from vehicle 601 of FIG. 6. Similarly, rating(s) 780 can be developed based on a report from vehicle 603 of FIG. 6. In addition, rating 770 can be determined based on a report from vehicle 608 of FIG. 6. The reports, when described as 'from' a vehicle, are being described as having their source from that vehicle. In other words, that vehicle has a source mobile sensor that transmits a packet for that vehicle. Within this context, 'from' does not refer to a vehicle that operates as an intermediary mobile sensor with respect to the transit data message/packet.

As can be appreciated, different weighting methods can be applied, for example, making allowances for the type of vehicle involved. As such, vehicles that are known to have unusual speed profiles, either consistently running faster than traffic, or consistently running slower than traffic, can be weighted at a lower weight, so that in the aggregate, the rating for a route discounts such vehicles. Examples of such vehicles can include motorcycles (which may run faster) or 18-wheel trucks (which may run slower than local traffic).

Table 700 includes rows corresponding to optional routes 730. Columns can be organized per vehicle identity. Thus, column labeled "1" is for transit data originating from vehicle 601 of FIG. 6. The table may be used to sum or otherwise aggregate transit data from the plural vehicles (mobile sensors) to (on the basis of corresponding segments traveled) establish the overall rating to assign to an optional route. Each vehicle may be identified by column headings 740. The rating may be treated as being relatively better when the rating is higher, as opposed to a rating that is lower, which is considered to be not as good as the higher rating. Average ratings 790 can be generated by taking an average of all ratings reported by vehicles that are on, or at least estimated to be on, each segment within a route. A highest average rating is the highest rating among the alternative routes determined during a sampling interval. Table 700 can be created, populated, redacted, and summarized in the manner described in FIG. 8.

FIG. 8 is a flowchart of processing performed at a mobile sensor in response to received transit data in accordance with an illustrative embodiment of the invention. Flowchart 800 shows a way for a mobile sensor to obtain ambient transit data and in real-time synthesize the relevant data packets into a ranking of routes, and then report at least the route that is best, based upon the received data packets. Initially, the mobile sensor may initialize itself with mobile sensor location and destination (step 801). The mobile sensor may receive its location from GPS signals, and determine its the destination by user inputs, for example, to a touch sensitive screen's corresponding map location. Next, the mobile sensor may determine a limited number of routes that are best, according to criteria (step 803). "Best" may be a simple determination of the combination of segments that yields the shortest distance from the mobile sensor location to the destination, that is, by using a shortest distance algorithm. The routes can be limited to a finite number, n, so that initial processing can terminate in a reasonable amount of time. Other criteria may be used in addition to, or alternatively to a shortest distance algorithm. For example, an initial time estimate can be determined using traveling speeds at posted speed limits for each segment. Accordingly, routes that correspond to the shortest time estimates may be among the n best routes, according to these criteria. These routes may be used to build an empty table having one row for each route.

The initial set of best routes can be established by locating a nearest road surface to the mobile sensor's current location, such as, for example, a driveway threshold, a curb, or a street upon which a vehicle is parked or traveling. A nearest road surface can be an endpoint. An endpoint is an end to a road surface, or the place where a vehicle is estimated to be, if the vehicle is estimated to be on a road. The road surface can be solid, or granular. The end can be a dead-end, a tee-intersection, or any discontinuity in a road. A road discontinuity can include, for example, a driveway, turf, mud, or beach transition from the road surface.

Next, the mobile sensor may receive and forward transit data (step 805). As explained above, transit data may be transmitted as packets that include location and velocity data. Next, the mobile sensor may determine whether transit data of a packet is on a segment among the n routes determined in step 803 (step 807). If not, the mobile sensor may continue to repeat step 805.

However, if the received packet holds transit data originating from a vehicle on one of the segments among the n routes, the mobile sensor continues by storing the velocity as a velocity corresponding to the route (step 809). Additional information from transit data can be stored. Accordingly, any part of the transit data, or inferences derived therefrom, can form stored transit data. A sampling period is a duration for which transit data is collected. The sampling period may be pre-determined by a manufacturer of a mobile sensor, or selected by a user of the mobile sensor. The sampling period may be dynamically changed so that when sparse data is arriving from transit data messages, the duration can be elongated. Next, the mobile sensor determines if a sampling period is expired (step 811). If the sampling period is unexpired, the mobile sensor repeats step 805.

On the other hand, the mobile sensor, if determining the sampling period to be expired, may calculate the rating per transit data report (step 813). The rating may be the velocity divided by the distance of the route on which the vehicle is hypothetically on. Accordingly, high ratings are an indication of better, or preferred routes, while low ratings are an indication of a less preferred route. The results of step 813 may be used to populate a table such as table 700 of FIG. 7.

Next, the mobile sensor may calculate an average of all ratings on a route-by-route basis (step 815). Such route-by-route ratings can be, for example, average ratings 790 of FIG. 7. Next, the mobile sensor may report via a user interface, the highest rated routes (step 817). The highest rated routes are thus reported as the best routes. The term "best", in this context, refers to a predicted shortest travel time, based on conditions reported during the sampling period. Thus, a "best" route is the route, based on data from a given sampling period, or a proxy thereof derived from posted speed limits along the route. A best route determination accordingly may make assumptions, such as that speed limits are observed or that vehicles remain on road surfaces among other limitations. Accordingly, the "best" route can be useful in predicting a shortest time to transit from the beginning location to the destination for land based vehicles. In addition, alternative embodiments can report the occurrences of some transit data that include weather, crash data and the like as well as the additional alternative routes, ordered by rating.

During a sampling period that produces a table shown in FIG. 7, the average ratings are best for route A-C-F-G with an average rating of 4.93 during the sampling period. Thus, the route A-C-F-G, relying at least on transit data reported from vehicles 603, 604, and 618, has an average rating of 4.93, and thus is better than other alternate routes, namely, A-B-D-G, and A-B-E-G, having average ratings of 4.7 and 3.96, respectively. Some cars may not report, or transit data may not be available, during the sampling period. Accordingly, some cells that may have had data in an earlier sampling period may be empty for the current sampling period.

Next, the mobile sensor can discard stored velocities, and potentially other stored transit data, and start a sampling period (step 819). The mobile sensor next repeats step 805. Accordingly, the combined effect of many of the steps of flowchart 800 is that ratings for the routes are based on all ratings received during the sampling period for each of the plurality of routes. Nevertheless, under some conditions, it is possible that one or more alternate routes do not have any transit data reported for them during a sampling period.

An alternative embodiment may substitute a posted speed limit for a velocity for a hypothetical vehicle. In other words, for each segment of the route, in place of normal transit data, a vehicle can be assumed to have reported the posted speed limit. Thus, a suitable rating can be formed for the combined segments that form the alternative route.

Figure 9:
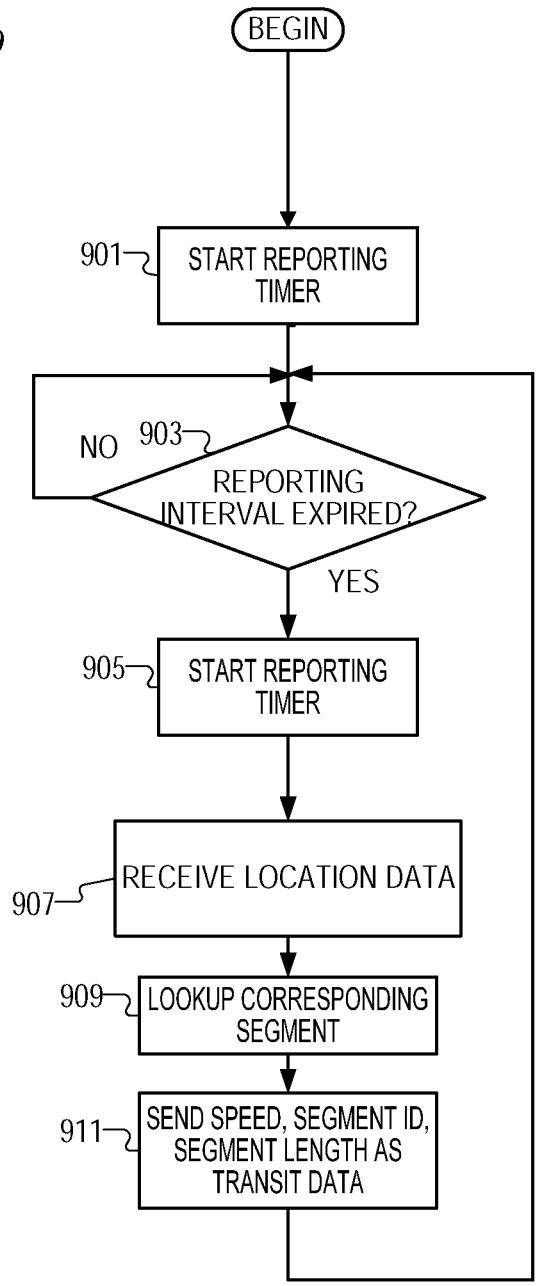
FIG. 9 is a flowchart of processing performed at a mobile sensor to periodically report to peer mobile sensors transit data in accordance with an illustrative embodiment of the invention.

FIG. 9 is a flowchart of processing performed at a mobile sensor to periodically report to peer mobile sensors transit data in accordance with an illustrative embodiment of the invention. A mobile sensor may begin by starting a reporting timer (step 901). Next, the mobile sensor may determine whether a reporting interval has expired (step 903). If the reporting interval is unexpired, the mobile sensor can repeatedly check by re-executing step 903.

In response to the reporting timer expiring, the mobile sensor may start the reporting timer (step 905). Next, the mobile sensor may receive location data (step 907). The location data can be received, at least in part, based on references to wireless signals, for example, GPS signals. Nevertheless, the mobile sensor can rely on additional data provided by dead-reckoning in the event that wireless signaling is older than a predetermined threshold or otherwise has too great a margin of error.

Next, the mobile sensor may lookup a corresponding segment to the location data (step 909). The corresponding segment can be initially looked up using the mobile sensor location. Further, the lookup can be based on a current velocity or at least a historical movement of the mobile sensor. Still further, the lookup can be based on a currently selected preferred route of the mobile sensor. Accordingly, the mobile sensor may disambiguate between segments when the mobile sensor is detected to be near or at an intersection.

Next, the mobile sensor may send speed, segment identifier and a segment length as transit data (step 911). As explained above, the mobile sensor is the originating mobile sensor with respect to transit data messages sent in step 911. A mobile sensor's velocity can include a heading of the mobile sensor. A heading can be either a magnetic heading, or an actual heading.

The illustrative embodiments permit a user to operate a mobile sensor to indicate a destination. The mobile sensor can make a first pass at determining a best route by obtaining alternative routes that form candidates for selecting a preferred or best route. Alternative routes are made up of road segments that in turn form criteria of a limited set of locations that the mobile sensor treats as relevant, and thus, worthy of further processing to synthesize ratings for the alternative routes. Contemporaneously with concluding a sampling period, the mobile sensor can update the ordering of best routes to identify one or more best routes to a user. Accordingly, the mobile sensor can operate as both a source for transit data, as well as a consumer of transit data to obtain near real-time traffic and other transit data from vehicles along segments that can form a leg to one or more alternative routes. Further, illustrative embodiments provide a mechanism to substitute posted speed limits for transit data when data collection is too sparse to obtain ratings for one or more routes.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

A data processing system suitable for storing and/or executing program code will include at least one processor coupled directly or indirectly to memory elements through a system bus. The memory elements can include local memory employed during actual execution of the program code, bulk storage, and cache memories, which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the mobile sensor to become coupled to other data processing systems or remote printers or computer-readable tangible storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method for selecting routes, the computer implemented method comprising:
    a recipient mobile sensor receiving a mobile sensor location and a destination;
    determining, from a repository of road segments, a plurality of routes having a first endpoint corresponding to the mobile sensor location, and a second endpoint corresponding to the destination, wherein each route is a distance-limited set of segments that connect at endpoints;
    receiving transit data from a plurality of peer mobile sensors, each on a vehicle, wherein the recipient mobile sensor receives a first at least one transit data comprising a first peer mobile sensor's velocity, a first vehicle type, and a first peer mobile sensor's location, and a second at least one transit data comprising a second peer mobile sensor's velocity, a second vehicle type, and a second peer mobile sensor's location, wherein each transit data comprises a peer mobile sensor's velocity and a peer mobile sensor's location;
    storing the first at least one transit data based on the first peer mobile sensor's velocity and the first peer mobile sensor's location corresponding to at least one of the plurality of routes and the second at least one transit data based on the second peer mobile sensor's velocity and the second peer mobile sensor's location corresponding to the at least one of the plurality of routes, thereby forming a first and a second at least one stored transit data;
    determining that a sampling period has expired;
    responsive to a determination that the sampling period has expired, discounting by partially weighting an influence of the first at least one transit data on a route rating of a route among the plurality of routes, based on the first vehicle type;
    responsive to a determination that the sampling period has expired, calculating the route rating, based on the first and the second at least one stored transit data;
    responsive to a determination that the sampling period has expired, summing the influence of the first at least one transit data to an influence of the second at least one stored transit data from the second vehicle type to form an average of all route ratings, wherein the first and second at least one transit data are received during the sampling period; and
    reporting at least a route description corresponding to a route associated with a highest average rating of all routes.

2. The computer implemented method of claim 1, wherein calculating further comprises:
    looking up a segment corresponding to the first and second at least one transit data;
    looking up at least one route among the plurality of routes, wherein the at least one route includes the segment;
    determining a route length for the at least one route; and
    setting the rating based on the route length divided by the peer mobile sensor's velocity.

3. The computer implemented method of claim 1, wherein reporting at least a route comprises:
    responsive to a determination that the sampling period has expired, determining that no transit data is received during the sampling period for at least one of the plurality of routes; and
    responsive to a determination that no transit data is received during the sampling period, reporting the at least one of the plurality of routes as a best route.

4. The computer implemented method of claim 1, wherein reporting at least a route corresponding to a stored transit route having best transit data or no transit data comprises reporting an estimated quickest route for the mobile sensor to traverse to reach the destination.

5. The computer implemented method of claim 1, wherein each route comprises at least two partial segments, wherein each partial segment is coextensive to a segment, wherein the partial segment has an end at a roadway threshold.

6. The computer implemented method of claim 1, wherein receiving transit data comprises:
    receiving, at the recipient mobile sensor, the transit data using an intermediary mobile sensor that is downstream from the recipient mobile sensor and not a source mobile sensor and using a long range transceiver, wherein the intermediary mobile sensor and long range transceiver form links in transmitting the transit data to the recipient mobile sensor.

7. A computer program product for selecting routes, the computer program product comprising:
   a computer readable storage device and program instructions stored thereon, the program instructions comprising:
   computer readable program code configured to receive a mobile sensor location and a destination;
   computer readable program code configured to determine, from a repository of road segments, a plurality of routes having a first endpoint corresponding to the mobile sensor location, and a second endpoint corresponding to the destination, wherein each route is a distance-limited set of segments that connect at endpoints;
   computer readable program code configured to receive transit data from a plurality of peer mobile sensors, each on a vehicle, wherein the recipient mobile sensor receives a first at least one transit data comprising a first peer mobile sensor's velocity, a first vehicle type, and a first peer mobile sensor's location, and a second at least one transit data comprising a second peer mobile sensor's velocity, a second vehicle type, and a second peer mobile sensor's location, wherein each transit data comprises a peer mobile sensor's velocity and a peer mobile sensor's location;
   computer readable program code configured to store the first at least one transit data based on the first peer mobile sensor's velocity and the first peer mobile sensor's location corresponding to at least one of the plurality of routes and the second at least one transit data based on the second peer mobile sensor's velocity and the second peer mobile sensor's location corresponding to the at least one of the plurality of routes, thereby forming a first and a second at least one stored transit data;
   computer readable program code configured to determine that a sampling period has expired;
   and in response, discount by partially weighting an influence of the first at least one transit data on a route rating of a route among the plurality of routes, based on the first vehicle type;
   computer readable program code configured to calculate the route rating, based on the first and the second at least one stored transit data, in response to a determination that the sampling period has expired;
   computer readable program code configured to, sum the influence of the first at least one transit data to an influence of the second at least one stored transit data from the second vehicle type to form an average of all route ratings, wherein the first and second at least one transit data are received during the sampling period, responsive to a determination that the sampling period has expired; and
   computer readable program code configured to report at least a route description corresponding to a route associated with a highest average rating of all routes.

8. The computer program product of claim 7, wherein computer readable program code configured to calculate further comprises:
   computer readable program code configured to look up a segment corresponding to the first and second at least one transit data;
   computer readable program code configured to look up at least one route among the plurality of routes, wherein the at least one route includes the segment;
   computer readable program code configured to determine a route length for the at least one route; and
   computer readable program code configured to set the rating based on the route length divided by the peer mobile sensor's velocity.

9. The computer program product of claim 7, wherein computer readable program code configured to report at least a route comprises:
   computer readable program code configured to determine that no transit data is received during the sampling period for at least one of the plurality of routes, responsive to a determination that the sampling period has expired; and
   computer readable program code configured to report the at least one of the plurality of routes as a best route, responsive to a determination that no transit data is received during the sampling period.

10. The computer program product of claim 7, wherein computer readable program code configured to report at least a route corresponding to a stored transit route having best transit data or no transit data comprises reporting an estimated quickest route for the mobile sensor to traverse to reach the destination.

11. The computer program product of claim 7, wherein each route comprises at least two partial segments, wherein each partial segment is coextensive to a segment, wherein the partial segment has an end at a roadway threshold.

12. The computer program product of claim 7, wherein receiving transit data comprises:
   computer readable program code configured to receive, at the recipient mobile sensor, the transit data using an intermediary mobile sensor that is downstream from the recipient mobile sensor and not a source mobile sensor and using a long range transceiver, wherein the intermediary mobile sensor and long range transceiver form links in transmitting the transit data to the recipient mobile sensor.

13. A data processing system for selecting routes, wherein processing system comprising: one or more processors, one or more computer-readable memories and one or more computer readable storage devices, the one or more computer readable storage devices having stored thereon:
   computer readable program code configured to receive a mobile sensor location and a destination;
   computer readable program code configured to determine, from a repository of road segments, a plurality of routes having a first endpoint corresponding to the mobile sensor location, and a second endpoint corresponding to the destination, wherein each route is a distance-limited set of segments that connect at endpoints;
   computer readable program code configured to receive transit data from a plurality of peer mobile sensors, each on a vehicle, wherein the recipient mobile sensor receives a first at least one transit data comprising a first peer mobile sensor's velocity, a first vehicle type, and a first peer mobile sensor's location, and a second at least one transit data comprising a second peer mobile sensor's velocity, a second vehicle type, and a second peer mobile sensor's location, wherein each transit data comprises a peer mobile sensor's velocity and a peer mobile sensor's location;
   computer readable program code configured to store the first at least one transit data based on the first peer mobile sensor's velocity and the first peer mobile sensor's location corresponding to at least one of the plurality of routes and the second at least one transit data based on the second peer mobile sensor's velocity and the second peer mobile sensor's location corresponding to the at least one of the plurality of routes, thereby forming a first and a second at least one stored transit data;

computer readable program code configured to determine that a sampling period has expired; and in response, discount by partially weighting an influence of the first at least one transit data on a route rating of a route among the plurality of routes, based on the first vehicle type;

computer readable program code configured to calculate the route rating, based on the first and the second at least one stored transit data, in response to a determination that the sampling period has expired;

computer readable program code configured to, sum the influence of the first at least one transit data to an influence of the second at least one stored transit data from the second vehicle type to form an average of all route ratings, wherein the first and second at least one transit data are received during the sampling period, responsive to a determination that the sampling period has expired; and computer readable program code configured to report at least a route description corresponding to a route associated with a highest average rating of all routes.

14. The data processing system of claim 13, wherein computer readable program code configured to calculate further comprises:

computer readable program code configured to look up a segment corresponding to the at least one transit data;

computer readable program code configured to look up at least one route among the plurality of routes, wherein the at least one route includes the segment;

computer readable program code configured to determine a route length for the at least one route; and computer readable program code configured to set the rating based on the route length divided by the peer mobile sensor's velocity.

15. The data processing system of claim 13, wherein computer readable program code configured to report at least a route comprises:

computer readable program code configured to determine that no transit data is received during the sampling period for at least one of the plurality of routes, responsive to a determination that the sampling period has expired; and computer readable program code configured to report the at least one of the plurality of routes as a best route, responsive to a determination that no transit data is received during the sampling period.

16. The data processing system of claim 13, wherein computer readable program code configured to report at least a route corresponding to a stored transit route having best transit data or no transit data comprises computer readable program code configured to report an estimated quickest route for the mobile sensor to traverse to reach the destination.

17. The data processing system of claim 13, wherein each route comprises at least two partial segments, wherein each partial segment is coextensive to a segment, wherein the partial segment has an end at a roadway threshold.

* * * * *